Oct. 8, 1935.     K. L. HERRMANN     2,016,923
ANTIFRICTION BEARING AND METHOD OF MAKING SAME
Filed May 19, 1934
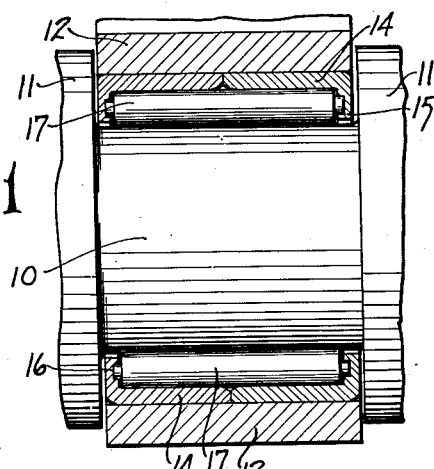
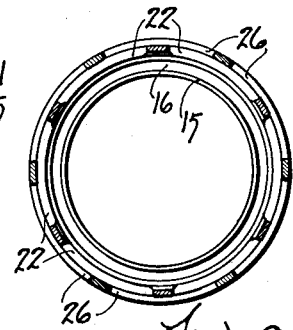
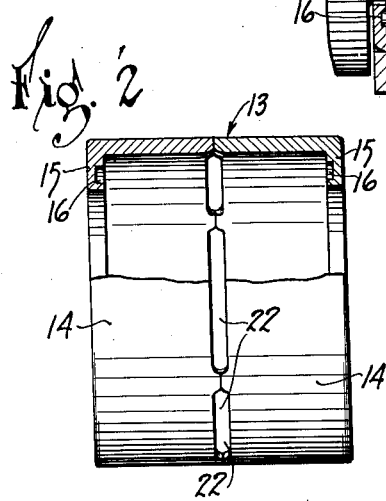
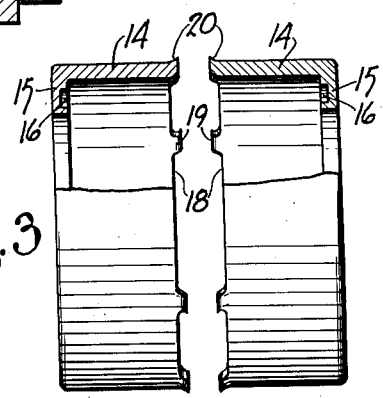
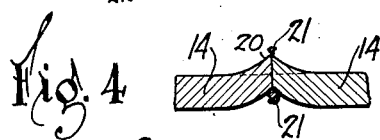
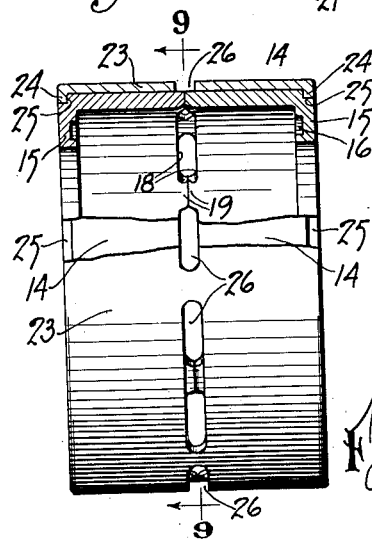
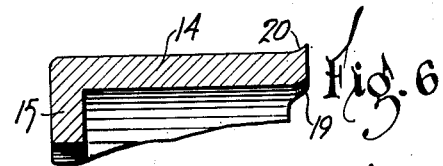
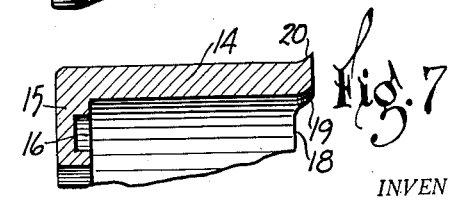
INVENTOR.
Karl L. Herrmann
BY
ATTORNEY Patented Oct. 8, 1935

2,016,923

UNITED STATES PATENT OFFICE 2,016,923

ANTIFRICTION BEARING AND METHOD OF MAKING SAME

Karl L. Herrmann, South Bend, Ind.

Application May 19, 1934, Serial No. 726,441

7 Claims. (Cl. 29—148.4)

This invention relates to anti-friction bearings and particularly to the cage or retainer for the anti-friction members, the principal object being to provide a retainer which will maintain the anti-friction members in assembled position.

Another object is to provide in a bearing of the full-roller type, a retainer formed to provide recesses for the ends of the rollers to thus maintain the latter in assembled position in the retainer.

Another object is to provide in a bearing of the full-roller type, a roller retainer formed of two parts, each part having a flange provided with a roller-receiving recess, and having lubricant pockets at the adjoining faces of the respective parts.

Another object is to provide a roller retainer formed of two cup-shaped members positioned in abutting relationship having lubricant pockets at their abutting ends.

A further object is to provide a roller retainer formed of two cup-shaped members positioned in abutting relationship, each member being deformed outwardly at the abutting edge to provide a lubricant pocket intermediate the ends of the rollers carried thereby.

A still further object is to provide a roller retainer formed of two cup-shaped members positioned in end-to-end relation and welded together at their adjacent ends, the members having cut-away portions along their adjacent edges and having the metal between the cut-away portions pressed outwardly out of contact with the rollers carried thereby.

Another object is to provide a practical and simple method of forming and assembling roller retainers in which the rollers are supported at their ends thereby.

Another object is to provide a method of forming and assembling roller retainers in which two cup-shaped members having roller-receiving recesses formed in the flanges thereof have their abutting edges pressed outwardly from the normal plane thereof, the members being welded together along their adjacent edges, after which the outturned metal on the outer face is ground flush with the cylindrical face of the retainer.

Other objects, and objects relating to details of construction and methods of manufacture will be apparent from the detailed description to follow.

In the drawing in which like numerals refer to like parts throughout the several views, Fig. 1 is a sectional view of an anti-friction bearing showing one form of my invention incorporated therein.

Fig. 2 is an elevational view of the roller retainer, parts of the same being broken away to better show the construction thereof.

Fig. 3 is a view similar to Fig. 2, showing the shape and construction of the two cup-shaped members forming the retainer prior to welding the members together.

Fig. 4 is an enlarged fragmentary sectional view better illustrating the shape of the cup-shaped members at their abutting faces and the welding of the same together.

Fig. 5 is a view similar to Fig. 4, showing the retainer after removing the excess metal on the outer faces of the cup-shaped members.

Fig. 6 is a fragmentary sectional view showing one of the retainer parts after being formed into a cup-shaped member.

Fig. 7 is a fragmentary sectional view of one of the cup-shaped members having the roller receiving recess pressed therein.

Fig. 8 is a view similar to Fig. 2 showing a slightly modified form of my invention.

Fig. 9 is a transverse sectional view taken on the line 9—9 of Fig. 8.

Heretofore when it was desired to use retainers or cages for maintaining the rollers in an anti-friction bearing in assembled position, it has been the common practice to provide such retainers which had spacing bars or bridges between the spaced end members, thus providing a construction in which the rollers were spaced from each other, thus preventing the use of a full-roller type bearing. Also, attempts have been made to provide a retainer for rollers in a full-roller type bearing in which the retainer was made of thin metal and the flanges thereof were pressed inwardly beneath the rollers to hold the same in assembled position. The first type of retainer prevents in use of a full row of rollers and the latter type of retainer presents manufacturing difficulties which applicant in the present invention has overcome.

It will be apparent from an inspection of the drawing that the flange portions of the retainer are deformed by a simple stamping operation to provide the recessed therein to receive the ends of the rollers without the necessity of bending or deforming the flanges after the rollers are positioned within the retainer or after the finishing of the retainer parts. Also, I have provided a retainer so formed that adequate lubrication is afforded for the rollers which it is apparent will materially lengthen the life of the bearing.

Referring to the drawing in detail and particularly to Fig. 1, I have shown an inner race member 10 which may be a shaft, or any suitable member, on which rollers are adapted to rotate and I have diagrammatically illustrated collars or flanges thereon adapted to serve as shoulders for the bearing presently to be described. I have also shown an outer member 12 which may be a support, surrounding the inner member 10 between which is interposed a retainer indicated generally by the numeral 13. The retainer is preferably formed of two cup-shaped members 14 which may be identical in construction except that they are right- and left-hand members, each member having a flange 15 formed thereon of sufficient depth to receive the rollers, as shown in Fig. 1. The members 14 are preferably, although not necessarily, made from tubular stock pressed to form the flanges 15 thereon in which are provided recesses 16 to receive the ends of the rollers 17. The recesses 16 in the flanges 15 are formed by depressing the metal to provide a thinner walled section at that point, or if desired by machining the recessed in the flanges 15. The adjacent edge face of each of the members 14 is preferably cut away at 18 to form oil pockets and to leave projecting portions 19 which are deformed outwardly at 20, as is best shown in Fig. 3. The members 14 are assembled in abutting relationship with the projecting parts 19 in contact with each other, after which they are butt-welded together, as indicated at 21. The retainer 13 when thus assembled provides oil pockets 22 around the periphery thereof whereby lubricant can be carried from the center of each of the rollers to the ends thereof to properly lubricate the same and the inner race member 10 together with the inner face of the retainer 13. Also, because of the deformed ends of the members 14, oil may flow from one oil pocket 22 to the next pocket and not be obstructed by the rollers 17.

After the cup-shaped members 14 are welded at 21, the outturned metal is preferably ground or machined away to provide a smooth cylindrical outer face, as shown in Fig. 5. Any high spots or rough edges of the welding on the inner face of the retainer are normally sufficiently removed from the rollers 17 that no machining is necessary on the inner face thereof to remove the rough spots caused by the welding. If perchance enough of the metal should flow to extend below the inner face of the retainer, a sharp instrument can be inserted through one of the pockets 22 to chip away such rough portions which it is apparent is a much less expensive operation than the machining of the entire inner face of the retainer.

The cup-shaped members 14 are preferably formed of relatively light material so that the flanges will yield sufficiently to permit the rollers 17 being assembled therein after the parts 14 are welded together. It has been found that the cup-shaped members can be formed of materials sufficiently thin in cross section so that the flanges 15 thereof will be sprung outwardly to receive the journaled end of the rollers 17 without damage to the retainer and without in any way impairing the efficiency thereof.

In the manufacture of the retainer previously described, I preferably form the flanges 15 on the members 14 after any approved method, cut away or stamp out the portions 18 to thus provide the projections 19 which may be done by a blanking operation or in some cases by machining, then press the portions 19 outwardly. The recesses 16 are then pressed or machined in the flanges 15 whereby the wall of the flange at the end of the recess is of less cross-sectional area than the remainder of the flange. The recesses 16 may be of any desired shape depending on the shape of the ends of the rollers to be carried by the retainer.

In Figs. 8 and 9, I have shown a slightly modified form of the invention in which the retainer 13 is formed from a pair of cup-shaped members 14 having flanges 15 thereon in which are formed recesses 16 for receiving the roller ends. Each of the members 14 is also preferably provided with cut-away portions 18 and having the projections 19 bent outwardly at 20 as previously described. Each of the cup-shaped members 14 is preferably recessed at 25 along the outer edge thereof, as shown in Fig. 8, so that when the members 14 are positioned in end-to-end relation with the projecting parts 19 in proper alignment, a sleeve 23 may be inserted thereover, and the edges thereof bent over at 24 to fit into the recess 25 to thus lock the members 14 together. With this construction, it is not necessary to weld the member 14 together as in the previously described use as the retainer 23 forms the locking means therefor and prevents them from separating. The sleeve 23 preferably has a series of slots or pockets 26 therein, as also shown in Figs. 8 and 9. The slots 26 in the sleeve 23 may if desired be in staggered relationship to the pockets 22 formed in the retainer 13 to thus provide more adequate clearance as an oil passage around the rollers 17, however, the sleeve 23 may be positioned on the retainer with the slots 26 therein in registering relationship with the oil pockets 22. As the cup-shaped members 14 are pressed outwardly at their abutting edges, machining or grinding of the interior face thereof is not necessary and also, as in the previously described use, I provide a lubricant pocket for the rollers to thus insure proper lubrication of the same. As in the previously described construction, the outturned parts 20 of the projections are smoothed out so that the sleeve 23 may be slipped over the retainer. As the methods of supplying lubricant to the bearing forms no part of my invention, I have not illustrated the same as it will be understood to those skilled in the art that lubricant may be supplied to the bearings by a variety of different means.

It will be apparent from the foregoing description that I have provided a retainer for a full roller type bearing in which it is not necessary to resort to bending the flanges inwardly or in any way distorting the same after the rollers are assembled therein but on the contrary I have provided a retainer in which the flanges thereof are substantially rectangular in cross section except for the roller-receiving recesses which are formed therein.

Although I have shown a retainer which forms the outer race-way for the roller, it will be readily understood by those skilled in the art that the construction can be reversed so that the retainer forms the inner race member for the rollers without in any way departing from the spirit and scope of my invention as the same constitutes merely a reversal of parts.

Having now described my invention so that others may understand the method of manufacturing anti-friction bearings in accordance with my method of making the same, I desire to claim both the method of manufacture and the articles so manufactured, and the invention is to be limited only by the scope of the sub-joined claims.

What I claim is:

1. An anti-friction bearing comprising, an inner race member, a roller retainer comprising an outer race member and rollers interposed between said race members carried by said retainer, said retainer comprising two abutting cup-shaped parts having recessed flanges supporting said rollers at the ends thereof and having recesses and offset portions at their abutting ends to provide oil pockets, the ends being welded to prevent separation of said retainer parts.

2. An anti-friction bearing comprising, an inner race member, a roller retainer comprising an outer race member, and rollers interposed between said race members carried by said retainer, said retainer comprising two abutting members each having recesses at their abutting ends to provide oil pockets, the metal intermediate said recesses being pressed radially out of contact with said rollers, and means to retain said members against separation.

3. A retainer for a full-roller type bearing comprising, two abutting cup-shaped members each having recessed flanges for supporting rollers at the ends thereof, and each having recesses formed therein at their abutting ends to provide oil pockets, and a sleeve having recesses therein overlapping the recesses in said cup-shaped members surrounding the latter and secured thereon to retain said members against longitudinal movement.

4. A retainer for a full-roller type bearing comprising, two abutting cup-shaped members each having recessed flanges for supporting rollers at the ends thereof, said members being butt-welded at their adjacent ends, the adjacent ends being offset to provide an oil pocket and to prevent the weld on the roller side of the retainer from contacting with said rollers.

5. The method of forming a roller retainer which comprises, forming a pair of opposed cup-shaped members, pressing roller-receiving recesses in the flanges of said members, stamping recesses in the adjacent faces of said members, deforming the metal between said last-named recesses, and welding the abutting faces of the projections between said named recesses together.

6. The method of forming a roller retainer which comprises, forming a pair of cup-shaped members, pressing roller-receiving recesses in the flanges of said members, forming recesses in the adjacent faces of said members, pressing outwardly the projections between said last-named recesses, removing the surplus metal of said outwardly pressed metal to form a cylinder, and securing said members together in abutting relation.

7. The method of forming a roller retainer which comprises, forming a pair of cup-shaped members, pressing roller-receiving recesses in the flanges of said members, forming recesses in the adjacent faces of said members, pressing outwardly the projections between said last-named recesses, butt-welding said projections in end-to-end relation, and removing the surplus metal on the cylindrical face of said retainer.

KARL L. HERRMANN.